UNITED STATES PATENT OFFICE.

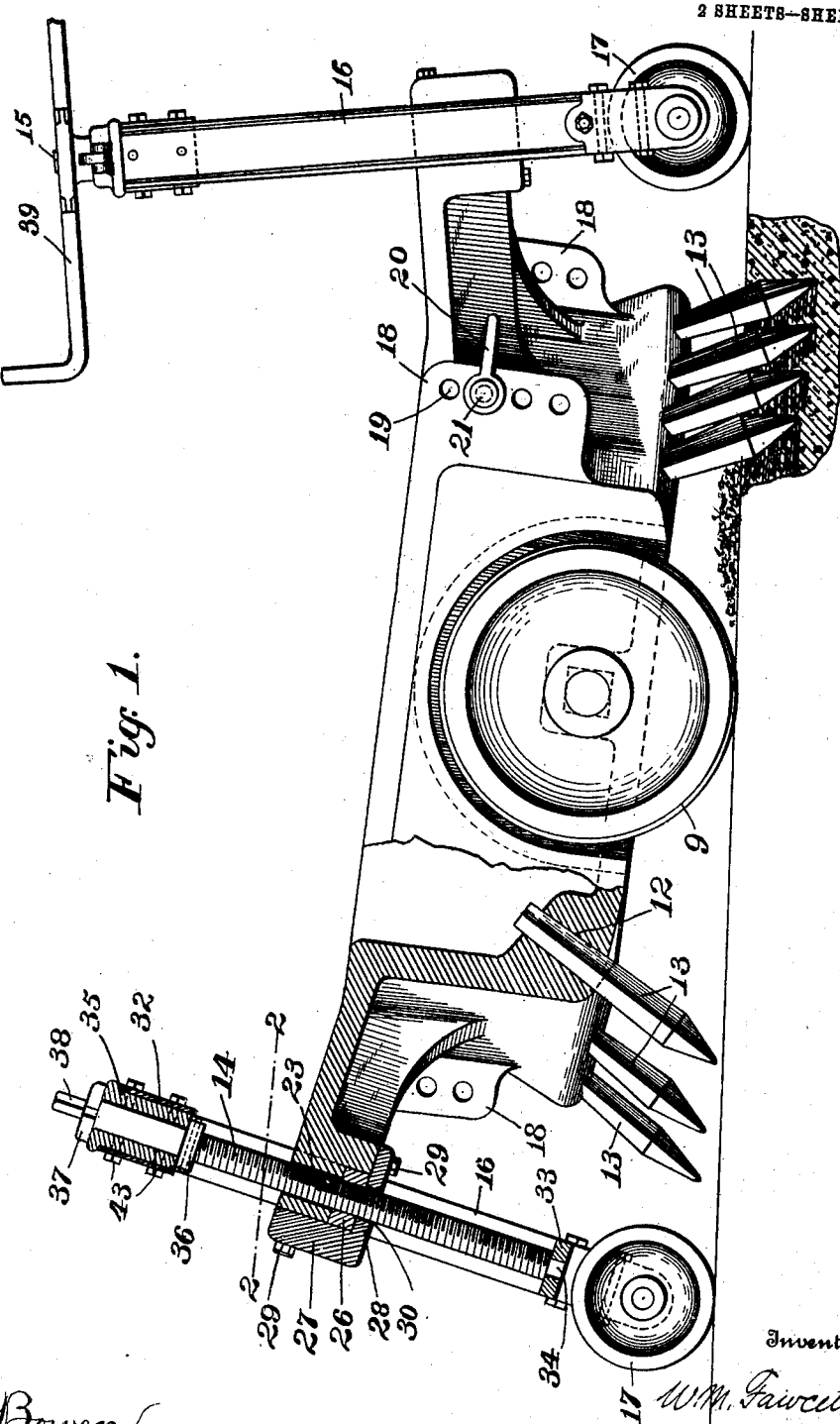

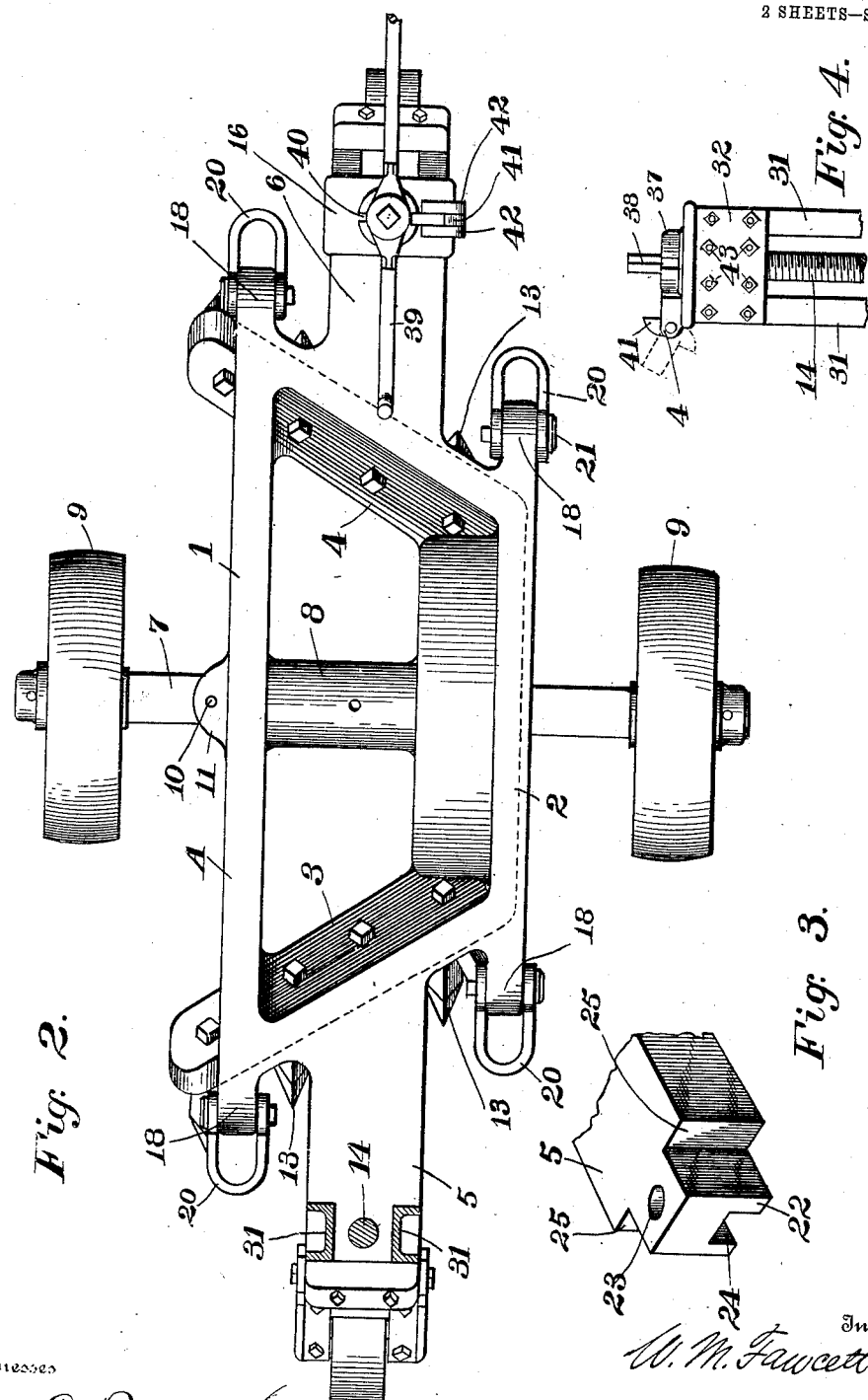

WILLIAM M. FAWCETT, OF ERIE, PENNSYLVANIA, ASSIGNOR TO JULIAN SCHOLL & COMPANY, OF NEW YORK, N. Y.

ROAD-SCARIFIER.

SPECIFICATION forming part of Letters Patent No. 719,099, dated January 27, 1903.

Application filed November 24, 1902. Serial No. 132,606. (No model.)

*To all whom it may concern:*

Be it known that I, WILLIAM M. FAWCETT, a citizen of the United States, residing at Erie, in the county of Erie and State of Pennsylvania, have invented certain new and useful Improvements in Road-Scarifiers, of which the following is a specification.

This invention comprises certain improvements in road-scarifiers designed to facilitate the operation of the machines and to provide for renewal of wearing parts.

In the accompanying drawings, Figure 1 is a side view of a scarifier, partly in central longitudinal section. Fig. 2 is a plan view of the machine, partly in section, on the line 2 2 of Fig. 1. Fig. 3 is a perspective view of one end of the main frame; and Fig. 4 is a front elevation of the upper portion of the adjusting-screw and its frame, showing the locking device for the screw.

Referring to the drawings, A indicates the main frame or body of the scarifier, comprising a heavy hollow casting having parallel side walls 1 and 2, convergent end walls 3 and 4, and longitudinally-projecting ends or goosenecks 5 and 6. The frame is mainly supported upon an axle 7, which is angular in cross-section and which extends through a suitable box or bearing 8, arranged transversely in the lower central part of the frame, the interior cross-section of the box being made to correspond with that of the axle. Supporting-wheels 9 are revolubly mounted on the ends of the axle, and the axle is normally secured against longitudinal movement by a removable pin 10, extending through an ear 11 at the side of the frame and into one of a series of openings in the axle. The axle and wheels are thus adjustable transversely of the frame in order that the scarifier-teeth may be brought close to the curb. In the base of each end wall of the frame is arranged a series of inclined openings 12, angular in cross-section and tapering upwardly, and within these openings are arranged pointed scarifying-teeth 13, the teeth at the opposite ends of the frame being inclined and arranged substantially as shown in Figs. 1 and 2. As the main portions of the frame, the adjustable axle, and the particular arrangement of the scarifying-teeth form no part of my present invention, a further detailed description of these parts is unnecessary.

At the ends of the goosenecks 5 and 6 are arranged adjusting-screws 14 and 15, these screws being mounted in frames 16, which are provided at their lower ends with wheels or rollers 17, which rollers normally rest upon the ground. By means of these adjusting-screws the scarifier-frame may be tilted about the axle 7, so that the teeth at either end of the scarifier may be brought into engagement with the ground and the teeth at the opposite end elevated above the ground, permitting the machine to be operated in either direction without turning it around. This operation will be plain from an inspection of Fig. 1.

The scarifier is ordinarily operated by connecting it to a steam traction-engine or road-roller, and after having been pulled a certain distance in one direction the scarifier and traction-engine are uncoupled and the latter is reversed and coupled to the opposite end of the scarifier for movement in the opposite direction. As the coupling devices on the opposite ends of the traction-engine are frequently of different heights, it is desirable to provide upon the scarifier a vertical series of attaching or coupling points or devices. This I provide by arranging at each side of each end of the scarifier-frame a vertical longitudinally-projecting flange 18, and each of these flanges is provided with a vertical series of bolt-holes 19. A clip 20 is provided for each flange, and also a bolt 21, adapted to pass through the eyes of the clip and through any one of the bolt holes or openings 19. By these means the clips may be attached at varying heights upon the scarifier-frame to suit the height of the coupling upon the traction-engine. The pull upon the scarifier-frame may therefore be maintained in a line parallel with the roadway, and when properly connected there is no upward pull upon the scarifier which would tend to lift the teeth.

As the ends of the goosenecks, the adjusting screws and frames, and the means for connecting said parts are the same at each end of the scarifier, a description of one set of parts will apply equally to the other set. Each gooseneck is formed, as shown in Fig. 3, with an end portion 22, having a vertical opening 23 extending therethrough and a longitudinal recess 24 in its lower side, forming an angular socket in line with the opening 23. This end portion is narrower than the main part of the gooseneck, leaving shoulders or guiding-faces 25 extending laterally from the base of the end portion 22. The adjusting-screw extends through the opening 23 and through a removable nut 26, arranged within the socket 24 and secured in place by a cap-plate 27, which cap-plate, as shown in Figs. 1 and 2, extends across in front of the end portion 22 and projects parallel with the guide-faces 25. The cap-plate has a flange 28 extending across and bearing against the face of the nut 26. The cap-plate is secured in place by bolts 29 extending into the gooseneck, and the flange portion 28 has an opening 30 in line with the opening 23 and through which the adjusting-screw extends. Each adjusting-screw frame 16 comprises parallel bars 31, connected together at their upper and lower ends by suitable cross-heads 32 and 33, respectively, and these side bars, as shown in Fig. 2, are guided between the laterally-projecting ends of the cap-plate and the guide-faces 25 and also bear against the sides of the projecting end 22. The frame while movable vertically in the guideways when the adjusting-screw is operated is nevertheless rigidly held against any turning movement. The lower end of the adjusting-screw is journaled in the cross-head 33, which forms a step-bearing, and the upper end of the screw is journaled in a bearing 35, secured within the cross-head 32, collars 36 and 37 being arranged upon the screw at either end of said latter bearing. Each screw has an angular projection 38 at its upper end, and a wrench 39, having a socket adapted to fit over said angular end, is provided for the purpose of operating the adjusting-screws.

It is important to provide means for locking the screws against turning after the frame has been set at the desired angle to the roadway, and for this purpose I provide radial slots 40 in the collar 37 and a latch 41, adapted to engage said slots. This latch is arranged between a pair of ears 42, secured on the top of the guide-frame, and these ears are elongated and form guides for the latch throughout the greater portion of its length in order to prevent lateral movement of the latch or strain upon its pivot-pin.

In order to replace a nut at one end of the machine, that end is lowered by turning the adjusting-screw. The cap-plate is then unbolted and the machine tilted in the opposite direction, thus raising the gooseneck away from the nut. The screw-bearing in the upper cross-head is then loosened by unscrewing the bolts 43, and the screw may then be lifted out of the lower cross-piece, permitting the cap-plate and nut to be removed from the lower end of the screw. After the new nut has been placed upon the screw these operations are reversed.

It will be seen that the nut, which bears the upward thrust of the screw, is backed by the massive end portion of the gooseneck and that the cap-plate supports it from below and excludes the dust and dirt. The arrangement of the socket and cap-plate might obviously be reversed, the socket being formed at the top of the vertical opening and the flange of the cap-plate extending over instead of under the nut. This, however, would require a heavier flange and is not so substantial or desirable an arrangement as that shown, but is within the scope of my invention.

The projecting ends of the frame to which the adjusting-screw frames are connected are for convenience termed "goosenecks;" but the form of these ends may of course vary to suit the particular form of the frame.

Having described my invention, what I claim as new, and desire to secure by Letters Patent, is—

1. A road-scarifier comprising a main frame, supported chiefly upon a central transversely-arranged axle, and having a gooseneck at each end, each gooseneck having an end portion provided with a vertical opening, a socket in line with said opening, and shoulders or guide-faces extending laterally from the base of said end portion, a removable nut within said socket, a cap-plate extending across and laterally beyond said end portion and having a flange bearing against the face of the nut, an adjusting-screw extending through said opening and nut, a screw-frame in which the ends of said screw are journaled, said frame comprising a pair of parallel guide-bars arranged between the cap-plate and said guide-faces, and a wheel or roller journaled in the base of said screw-frame.

2. A road-scarifier comprising a main frame, supported chiefly upon a central, transversely-arranged axle and having a gooseneck at each end, each gooseneck having an end portion provided with a vertical opening and an angular socket at one end of said opening, a nut within said socket, a cap-plate having a part extending over the face of the nut, an adjusting-screw extending through said opening and nut, and a frame in which said screw is journaled, said frame having a wheel or roller at its lower end.

3. A road-scarifier comprising a main frame, supported chiefly upon a central, transversely-arranged axle and having a gooseneck at each end, each gooseneck having an end portion provided with a vertical opening and a longitudinal slot in its lower face, forming a socket in line with the opening, a nut within said socket, a cap-plate closing the end of the slot and having a flange extending over the face of the nut, an adjusting-screw extending through the nut and opening and a frame in which said screw is journaled, said frame having a wheel or roller at its lower end.

4. A road-scarifier comprising a main frame supported chiefly upon a central transversely-arranged axle, an adjusting-screw and a screw-frame at each end of the main frame, said screw-frame having a wheel or roller at its lower end, a collar secured upon the upper end of the screw, said collar having radial slots therein, a pair of parallel elongated latch-guides upon the screw-frame, and a latch pivoted between said guides and adapted to engage the slots in said collar.

5. In a road-scarifier, a frame chiefly supported upon a central transverse axle and comprising a casting having side and end walls, a gooseneck projecting from each end wall, and vertical flanges projecting longitudinally from each of said end walls at each side of the gooseneck, each flange having a vertical series of bolt-holes therethrough, and a wheel or roller connected to and supporting each gooseneck and adjustable vertically relatively thereto.

In testimony whereof I affix my signature in presence of two witnesses.

WILLIAM M. FAWCETT.

Witnesses:
DAVENPORT R. SHIRK,
W. P. GIFFORD.